3,248,290
ANTITUSSIVE COMPOSITIONS
Margaret Rose Zentner, West Orange, N.J., assignor to Hoffmann-La Roche Inc., Nutley, N.J., a corporation of New Jersey
No Drawing. Filed Aug. 9, 1962, Ser. No. 215,798
7 Claims. (Cl. 167—55)

This invention relates, in general, to pharmaceutical preparations. More particularly, it relates to novel compositions having long-lasting antitussive activity and to a method for producing such compositions.

In my copending United States patent application Serial No. 149,539, filed November 2, 1961, now U.S. Patent No. 3,140,978, a novel class of pharmaceutical preparations is described. These preparations are obtained by reacting a drug, having a secondary or tertiary nitrogen atom in its structure, with a complex magnesium aluminum silicate compound. While the invention discloses in application Serial No. 149,539 serves primarily to render otherwise bitter tasting drugs tasteless, in several instances, ancillary advantages are noted. For example, application Serial No. 149,539 discloses that the product, which is obtained by reacting d-3-methoxy-N-methylmorphinan hydrobromide with a complex magnesium aluminum silicate compound, possesses antitussive activity which is long-lasting as compared to that of the drug alone.

It has now been found that enhancement of the antitussive activity of acid addition salts of d-3-methoxy-N-methylmorphinan, which is even more pronounced than that observed in the practice of the invention disclosed in application Serial No. 149,539, can be achieved when such a salt is reacted with a colloidal clay of the type described hereinafter. The reaction products which are obtained by the present method exhibit antitussive properties which, both in duration of activity and in peak of activity, are dramatically superior both to d-3-methoxy-N-methylmorphinan, or a salt thereof, and to reaction products of d-3-methoxy-N-methylmorphinan acid addition salts with complex magnesium aluminum silicates, prepared as described in application Serial No. 149,539.

Thus, in its most comprehensive embodiment, the present invention is concerned with products having outstanding antitussive activity.

In a more particular embodiment, the invention is concerned with antitussive products which exhibit prolonged, and more efficacious peak, activity.

In a further embodiment, the invention is concerned with a process for producing such products.

In a still further embodiment, the invention is concerned with pharmaceutical preparations which contain the antitussive products described herein.

It has been found that products having enhanced antitussive characteristics are obtained by reacting a colloidal clay, in hydrated form, with a salt formed by the reaction of d-3-methoxy-N-methylmorphinan with a medicinally acceptable acid. These products, either alone or in admixture with other therapeutically active ingredients, can be formulated into pharmaceutical preparations suitable for oral administration.

In general, the hydrated clays which are employed in the practice of this invention can be obtained readily from any of the well-known, commercially available colloidal clays. Complex magnesium aluminum silicate compounds sold by R. T. Vanderbilt Company, Inc., New York, New York, under the trade name "Veegum," when hydrated, have been found to be particularly well suited for use. The chemical analysis of the regular grade of Veegum, expressed as oxides, is as follows:

| | Percent |
|---|---|
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

Additionally, if desired, one can use hydrated neutral Veegum in the practice of this invention. Neutral Veegum, like the regular grade of Veegum, is a product marketed by R. T. Vanderbilt Company, Inc., New York, New York. Its chemical analysis differs from that of the regular grade of Veegum set out heretofore, only in that its sodium content, expressed as sodium oxide, is about 1.0%. The regular grade of Veegum has a sodium content, expressed as sodium oxide, of about 2.9%. Moreover, in the form of a 5% by weight aqueous dispersion, neutral Veegum has a pH of about 7.5 to 8.5 whereas a 5% by weight aqueous dispersion of the regular grade of Veegum has a pH of about 9.0. Finally, neutral Veegum has an acid demand of less than 1 cc. of N/10 hydrochloric acid per gram, whereas the acid demand of the regular grade of Veegum is about 6 to 8 cc. of N/10 hydrochloric acid per gram.

It should be understood, however, that hydrated clays obtained from sources other than Veegum can be used in carrying out this invention. For example, hydrated bentonite has been found to be especially well suited for use. Additionally, other hydrated aluminum silicates, as well as hydrated magnesium silicates and hydrated complex magnesium aluminum silicates can be employed.

Hydration of the colloidal clay, prior to its reaction with the acid addition salt of d-3-methoxy-N-methylmorphinan, can be readily accomplished. It should be understood, however, that the method by which the clay is hydrated prior to its use herein is not, in and of itself, a part of the present invention. As a general rule, the clay is hydrated merely by stirring it in water, preferably at an elevated temperature. The hydrated clays which are used in producing the preferred products of the invention can be obtained, for example, by stirring the colloidal clay in water, at a temperature within the range of from about 60° C. to 95° C., for a period of from about 30 to about 60 minutes. Obviously, however, variations in this procedure are possible without departing from the scope of the present invention.

After its hydration, the hydrated clay is reacted with a suitable salt of d-3-methoxy-N-methylmorphinan. In general, one may use any water-soluble acid addition salt formed by reacting d-3-methoxy-N-methylmorphinan with a medicinally acceptable organic or inorganic acid. However, d-3-methoxy-N-methylmorphinan hydrobromide is used as a reactant in the preferred embodiment of the invention.

The reaction of the hydrated clay with the d-3-methoxy-N-methylmorphinan acid addition salt is readily accomplished. As indicated heretofore, the clay is hydrated by stirring it in water. Generally, from about 5 to about 20 parts by weight of water will be used for each part by weight of clay to be hydrated. The present products can be obtained merely by mixing the hydrated clay, without isolating it from the water in which it was hydrated, with an aqueous solution of the d-3-methoxy-N-methylmorphinan acid addition salt. Mixing of the reactants, in the presence of water, brings about the desired reaction. While the reaction can be effected merely by mixing at room temperature, the use of elevated temperatures, for example, 35° C. to 95° C., is preferred. At such elevated temperatures, mixing of the reactants for a period of from about 30 to about 60 minutes generally will suffice to bring the reaction to substantial completion.

The concentration of the aqueous d-3-methoxy-N-methylmorphinan acid addition salt solution which is used in the practice of this invention is not particularly critical. Generally, however, the hydrated clay will be reacted with an aqueous solution containing at least 1.0%, by weight, of d-3-methoxy-N-methylmorphinan acid addition salt. More highly concentrated solutions of d-3-methoxy-N-methylmorphinan salt can be used, however, if desired.

The quantities of d-3-methoxy-N-methylmorphinan acid addition salt and hydrated clay employed in carrying out this invention can be varied. Generally, the reaction mixture will be provided with at least 2.0 parts by weight of hydrated clay for each part by weight of d-3-methoxy-N-methylmorphinan acid addition salt therein. However, up to about 20.0 parts by weight of hydrated clay can be provided for each part by weight of d-3-methoxy-N-morphinan salt present in the reaction mixture. The preferred products are prepared using from about 3.0 to about 12.0 parts by weight of hydrated clay for each part by weight of d-3-methoxy-N-methylmorphinan acid additional salt.

The products, which are produced in the practice of this invention, are such that they can be formulated, readily, into pharmaceutical preparations for oral administration. In general, the products of this invention are compatible with the liquid vehicles which are ordinarily used in the formulation of pharmaceutical suspensions and emulsions. Such emulsions and suspensions can be prepared by conventional techniques. Additionally, such emulsions and suspensions can contain any of the various optional ingredients normally used in the production of pharmaceutical preparations of this nature. These ingredients include, for example, coloring agents, flavoring agents, sweetening agents, preservatives, dispersing agents, emulsifying agents, etc. The manner in which such emulsions and suspensions are prepared will be readily apparent to those skilled in the art.

Furthermore, the long-lasting antitussive compositions of this invention can be used in conjunction with other therapeutically active ingredients normally found in medicinal preparations used for the treatment of colds, coughs, etc. For example, the reaction products described herein can be embodied into a preparation which contains also one or more antihistamines, one or more decongestants, one or more analgesics or any combination of such agents. As the antihistamine component of such preparations, chlorpheniramine, phenindamine, etc., and medicinally acceptable acid addition salts thereof, can be used. As the decongestant component of such preparations, one may use phenylephrine hydrochloride, d-desoxyephedrine hydrochloride, etc. Analgesic agents which are suitable for use in the formulation of these combination products include p-ethoxyacetanilide, or as it is more commonly called phenacetin, n-acetyl-p-aminophenol, salicyclamide, etc. It is to be understood, however, that the foregoing named antihistamines, decongestants and analgesics are given by way of example only. In general, the invention will be fully operable in like manner using any conventional antihistamine, decongestant and/or analgesic agent.

In producing the combination preparations, that is, those products containing therapeutically active ingredients, other than d-3-methoxy-N-methylmorphinan acid addition salts, the optional active ingredients can be admixed with the d-3-methoxy-N-methylmorphinan salt component either before or after the reaction of that component with the hydrated clay. For example, the d-3-methoxy-N-methylmorphinan acid addition salt can be reacted with the hydrated clay, if desired, while in admixture with the optional therapeutic agents. One distinct advantage of mixing the optional thereapeutic agents with the d-3-methoxy-N-methylmorphinan salt proior to its reaction with the hydrated clay is that, in certain instances at least, for example, in the case of chlorpheniramine maleate and phenylphrine hydrochloride, both of which are bitter tasting drugs, these compounds are rendered less bitter and, hence, more palatable. In general, since the present invention embodies the reaction of the d-3-methoxy-N-methylmorphinan acid addition salt with the hydrated clay in water, the foregoing method will be applicable where the optional therapeutic agents in use are water-soluble. In an alternate method, the optional ingredients, regardless of their water-solubility, can be added at some other stage in the actual formulation of the combination preparation, either before or after the incorporation therein of the hydrated clay-d-3-methoxy-N-methylmorphinan acid addition salt reaction product.

Pharmaceutical preparations which are formulated using the reaction products produced as described herein are devoid of the bitter taste which normally characterizes products containing d-3-methoxy-N-methylmorphinan, and its acid addition salts. However, these preparations are more particularly characterized by the pronounced enhancement of the antitussive properties of the active component thereof. For example, it has been found that, when a suspension, containing a product produced by reacting d-3-methoxy-N-methylmorphinan hydrobromide with a hydrated clay, was administered, the duration of cough inhibition has been increased by up to about 3.5 hours and the degree of inhibition has been increased by up to about 13% as compared to the results obtained upon the administration of a solution containing d-3-methoxy-N-methylmorphinan hydrobromide alone. For comparative purposes, similar tests were carried out in connection with products produced by reacting d-3-methoxy-N-methylmorphinan hydrobromide with a non-hydrated complex magnesium aluminum silicate as disclosed in copending application Serial No. 149,539. Using products of the latter type, the duration of cough inhibition was increased by only about 2 to 2½ hours as compared to d-3-methoxy-N-methylmorphinan hydrobromide alone, with the onset and degree of inhibition being the same as with d-3-methoxy-N-methylmorphinan alone.

For a fuller understanding of the nature and objects of this invention, reference may be had to the following examples which are given merely as further illustrations of the invention and are not to be construed in a limiting sense.

*Example 1*

In this example, 1.24 grams of Veegum F (a complex magnesium aluminum silicate manufactured and sold by R. T. Vanderbilt Company, New York, New York) was added with stirring to 22.0 cc. distilled water. Prior to adding the Veegum F thereto, the distilled water had been heated to a temperature of about 90° C. This mixture was stirred continuously at a temperature of 80° C. to 85° C. for a period of about 1 hour.

In a separate vessel, 0.31 gram of d-3-methoxy-N-methylmorphinan hydrobromide was dissolved in 20 cc. of distilled water. This solution was warmed to a temperature of about 50° C. and it was slowly added to the hydrated clay product prepared as described in the preceding paragraph. The addition was carried out accompanied by high-speed agitation. When about one-quarter of the d-3-methoxy-N-methylmorphinan hydrobromide solution had been added, the reaction mixture became extremely viscous. However, as additional quantities of the d-3-methoxy-N-methylmorphinan hydrobromide solution were added, a non-viscous suspension was obtained. After all of the solution had been added, agitation was continued for a period of about 30 minutes, with the reaction mixture during this period being maintained at a temperature of about 50° C.

The aqueous product, produced as described in the preceding paragraph, was thereafter formulated into a suspension suitable for oral administration. The suspension was prepared by adding to the aqueous product of this example 0.1 gram of Myrj 45 (polyoxyethylene (8) stearate, a dispersing agent, manufactured and sold by Atlas Powder Company, Wilmington Delaware) and 55.0 grams of sucrose USP. To this was added a solution containing 0.09 gram of propylparaben, 0.02 gram of methylparaben and 12.5 grams of glycerin. To the mixture thus obtained there was added a solution containing the following-named ingredients in the quantities indicated:

| | |
|---|---|
| Distilled water _____cc__ | 2.0 |
| Sodium hydroxide _____grams__ | 0.1 |
| Benzoic acid _____do____ | 0.25 |
| Di-sodium ethylene diamine tetraacetic acid _____do____ | 0.01 |
| Sorbo (sorbitol solution 70%) _____do____ | 14.3 |

This mixture was stirred thoroughly at room temperature and to it was added 1.0 gram of citric acid. Thereafter, a dispersion of 0.0033 gram of Anti-foam C (a defoamer manufactured and sold by the Dow Corning Corporation, Midland, Michigan) in 1.0 cc. of distilled water was added thereto. Coloring and flavoring agents were then added and the pH of the mixture was adjusted with sodium hydroxide to within the range of 3.8 to 4.0. The product was made up to 100 cc., using distilled water, as needed. Thereafter, the suspension was homogenized.

The suspension, thus obtained, was evaluated for its antitussive activity by a procedure entitled "A Method for the Evaluation of Antitussive Agents in the Unanesthetized Dog," described in the Journal of Pharmacological and Experimental Therapeutics, volume 108, No. 2, June 1953, at pages 217 to 223, inclusive. This test method involves the inducement of a cough by electrical stimulation of the trachea through previously implanted copper electrodes into the tracheal submucosa.

It was found that the suspension, prepared as described in this example, increased cough inhibition by about 3½ hours and the degree of inhibition by about 10% as compared to suspensions containing d-3-methoxy-N-methylmorphinan hydrobromide itself.

*Example 2*

In this example 2.79 grams of colloidal aluminum silicate were hydrated by stirring and heating same in 20.0 cc. of distilled water for one hour at a temperature of from about 80° C. to 90° C.

To the hydrated product, produced as described in the preceding paragraph, there was added a solution of 0.31 gram of d-3-methoxy-N-methylmorphinan hydrobromide in 15 cc. of distilled water. The latter solution had been heated to 90° C. immediately prior to its use. The reaction mixture became slightly viscous during the addition of the aqueous d-3-methoxy-N-methylmorphinan solution but it thinned out after about one-half of the solution had been added. The mixture was stirred continuously during the addition of the aqueous d-3-methoxy-N-methylmorphinan hydrobromide solution and stirring was continued for a period of 30 minutes after the addition was complete.

A suspension of the product produced as described in the preceding paragraph was prepared using the same ingredients and the same qunatities thereof as were used in preparing the suspension of the product of Example 1. The antitussive activity of such suspension was evaluated by the same test procedure as was the suspension of Example 1. It was found that the suspension described in this example increased cough inhibition by about 3½ hours and the degree of inhibition by about 13% as compared to suspensions containing d-3-methoxy-N-methylmorphinan hydrobromide itself.

*Example 3*

In this example 2.79 grams of bentonite were added, with stirring, to 20 cc. of distilled water. The mixture was stirred and heated at 80° C. to 85° C. for a period of about one hour.

To the hydrated bentonite, thus obtained, there was added a solution of 0.31 gram of d-3-methoxy-N-methylmorphinan hydrobromide in 15.0 cc of distilled water. The mixture, which became quite viscous, was stirred at a temperature of 80° C. to 85° C. for about 30 minutes.

A suspension of the product, thus obtained, was prepared by the method described in Example 1. The ingredients and the quantities thereof employed were the same as those used in preparing the suspension produced in Example 1. The suspension was evaluated for its antitussive activity by the test method referred to in Example 1. It was found that the suspension containing the reaction product of this example increased cough inhibition by about 3½ hours and the degree of inhibition by about 13% as compared to suspensions containing d-3-methoxy-N-methylmorphinan itself.

*Example 4*

In this example, there was produced a suspension containing chloropheniramine maleate, phenylephrine hydrochloride and phenacetin in admixture with the reaction product of d-3-methoxy-N-methylmorphinan hydrobromide and a hydrated clay.

This suspension was prepared in the following manner. 1.8 gram of Veegum F was added, with stirring, to 33.0 cc. of distilled water at a temperature of 90° C. The mixture was stirred, at a temperature within the range of from about 80° C. to 85° C., for a period of about one hour. Thereafter, 14.3 grams of sorbitol solution (70%) was added to the hydrated clay thus produced, followed by the addition of a solution of 0.309 gram of d-3-methoxy-N-methylmorphinan hydrobromide in 5.0 cc. of distilled water. The reaction mixture was stirred for a period of about one hour, and thereafter 0.1 gram of Myrj 45 (polyoxyethylene (8) stearate) and 35.0 grams of sucrose were added thereto.

A solution containing 6.25 grams of glycerine, USP, 0.09 gram of propylparaben and 0.02 gram of methylparaben was then added to the product. Thereafter, a solution composed of 1.5 gram of distilled water, 0.2 gram of sodium hydroxide, 0.25 gram of benzoic acid and 0.01 gram of disodium sequestrene was added to the mixture. The mixture was stirred thoroughly and 1.25 gram of citric acid, USP was added thereto. A slurry was then prepared containing 6.0 cc. of distilled water, 0.05 gram of Pluronics F–68 (a solid block polymer surfactant having a molecular weight of about 8750, marketed by Wyandotte Chemicals Corporation, Wyandotte, Michigan), 0.0033 gram of Anti-foam C, 3.264 gram of phenacetin powder and 14.3 gram of sorbitol solution (70%) and this slurry was added to the main mixture. Subsequently, a solution containing 0.5 cc. of distilled water, 0.0206 gram of chlorpheniramine maleate and 0.103 gram of phenylephrine hydrochloride was added to, and mixed with, the mixture. After the addition of coloring and flavoring agents, as needed, the mixture was adjusted to pH 4.0 with sodium hydroxide. Finally, sufficient water was added to make 100 cc.

The suspension, thus obtained, was evaluated for the antitussive activity of the d-3-methoxy-N-methylmorphinan hydrobromide component thereof by the test method referred to in Example 1. It showed a sustained antitussive effect, lasting for about 6 hours with peak inhibition of 83%.

*Example 5*

In this example, there was prepared a suspension containing chlorpheniramine maleate and phenylephrine hydrochloride in admixture with a d-3-methoxy-N-methylmorphinan-hydrated clay reaction product.

In producing this suspension, 2.3 grams of Veegum F were first added to 40 cc. of hot distilled water. The mixture was heated and stirred for a period of about one hour, following which 14.3 grams of sorbitol solution (70%) were added thereto. Thereafter, a solution containing 0.31 gram of d-3-methoxy-N-methylmorphinan hydrobromide, 0.042 gram of chlorpheniramine maleate and 0.206 gram of phenylephrine hydrochloride in 5.0 cc. of distilled water was added to the hydrated Veegum F product. The reaction mixture was then stirred for a period of about one hour. Subsequently, the following named ingredients were added to the reaction product, in the quantities hereinafter indicated:

| | Gram |
|---|---|
| Myrj 45 (polyoxyethylene (8) stearate) | 0.1 |
| Sucrose | 30.0 |
| Glycerine | 12.5 |
| Propylparaben | 0.09 |
| Methylparaben | 0.02 |
| Sodium hydroxide | 0.15 |
| Benzoic acid | 0.25 |
| Di-sodium ethylenediamine tetraacetic acid | 0.01 |
| Sodium sucaryl | 0.1 |
| Sodium saccharin | 0.1 |
| Sorbitol solution (70%) | 14.3 |
| Citric acid | 1.06 |
| Anti-foam C | 0.0033 |
| Coloring agents | as needed |
| Flavoring agents | as needed |

Sodium hydroxide, q.s. to pH 4.0.
Distilled water q.s. to make 100 cc.

The suspension, thus prepared, was evaluated for its antitussive activity by the test method identified in Example 1. When so tested, the suspension exhibited a duration of action of 6 hours and a peak cough inhibition of 87%.

*Example 6*

In this example, 3.2 grams of neutral Veegum were hydrated by stirring same in water at a temperature of from about 80° C. to 85° C. for a period of about one hour. Thereafter, a solution of 0.31 gram of d-3-methoxy-N-methylmorphinan hydrobromide, 0.042 gram of chlorpheniramine maleate, 0.206 gram of phenylephrine hydrochloride and 5.0 cc. of distilled water was added to the hydrated neutral Veegum. The reaction mixture was then stirred for one hour and the product was embodied into a suspension, suitable for medicinal use, by the method described in, and using adjuvant materials similar to those employed in Example 5.

*Example 7*

In this example, 139.5 grams of hydrous magnesium silicate were added to 1500 cc. of distilled water which was heated to a temperature of 90° C. This mixture was stirred and heated at a temperature of from 80° C. to 85° C. for a period of one hour to bring about the hydration of the magnesium silicate.

Thereafter, a solution of 15.5 grams of d-3-methoxy-N-methylmorphinan hydrobromide in 500 cc. of distilled water was added, with stirring, to the aqueous product produced as described in the preceding paragraph. Stirring was continued for a period of about one hour, and during this time the reaction mixture was maintained continuously at a temperature of about 60° C.

At the end of the one hour period, 5.0 gram of Myrj 45 (polyoxyethylene (8) stearate) and 2750 grams of sucrose were added to, and mixed with, the reaction mixture obtained as described in the preceding paragraph. Subsequently, a solution containing 625.0 grams of glycerine, 4.5 grams of propylparaben and 1.0 gram of methylparaben and, thereafter, a solution containing 100.0 cc. of distilled water, 7.5 grams of sodium hydroxide, 12.5 grams of benzoic acid, 0.5 gram of disodium ethylene diamine tetraacetic acid, 715.0 grams of sorbitol solution (70%) and 50.0 grams of citric acid were added to, and mixed with the mixture. A solution of 0.165 gram of Anti-foam C in 5.0 cc. of distilled water was then incorporated into the mixture. Coloring agents and flavoring agents were added as needed. The mixture was adjusted with sodium hydroxide to pH 4.0 and distilled water was added to make 5.0 liter.

The suspension which was thus obtained was then homogenized.

I claim:

1. A product having improved antitussive activity, said product being produced by reacting, in the presence of water, colloidal clay in hydrated form with d-3-methoxy-N-methylmorphinan salt of a medicinally acceptable acid.

2. The product of claim 1 wherein the acid addition salt of d-3-methoxy-N-methylmorphinan is reacted with the colloidal clay in hydrated form while in admixture with other water-soluble therapeutic agents.

3. A product having improved antitussive activity, said product being produced by reacting, in the presence of water, hydrated complex magnesium aluminum silicate with the hydrobromide salt of d-3-methoxy-N-methylmorphinan.

4. A pharmaceutical preparation, in liquid form, comprising a medicinally acceptable liquid vehicle having incorporated therein a product produced by reacting, in the presence of water, colloidal clay in hydrated form with d-3-methoxy-N-methylmorphinan salt of a medicinally acceptable acid.

5. The pharmaceutical preparation of claim 4 which contains a compound selected from the group consisting of an acid addition salt of chlorpheniramine with a medicinally acceptable acid, an acid addition salt of phenylephrine with a medicinally acceptable acid, phenacetin and mixtures thereof.

6. The pharmaceutical preparation of claim 4 which contains a product produced by reacting hydrated complex magnesium aluminum silicate with the hydrobromide salt of d-3-methoxy-N-methylmorphinan.

7. The pharmaceutical preparation of claim 6 which contains a compound selected from the group consisting of chlorpheniramine maleate, phenylephrine hydrochloride, phenacetin and mixtures thereof.

References Cited by the Examiner

Technical Bulletin, No. 29, Veegum, R. T. Vanderbilt Co., New York, Received by Patent Office Library June 22, 1960.

JULIAN S. LEVITT, *Primary Examiner.*

FRANK CACCIAPAGLIA, JR., LEWIS GOTTS,
*Examiners.*